United States Patent
Sarsanedas Millet et al.

(10) Patent No.: US 11,970,633 B2
(45) Date of Patent: Apr. 30, 2024

(54) USE OF SULFONIC ACIDS IN DRY ELECTROLYTES TO POLISH METAL SURFACES THROUGH ION TRANSPORT

(71) Applicant: DRYLYTE, S.L., Barcelona (ES)

(72) Inventors: Pau Sarsanedas Millet, Barcelona (ES); Marc Sarsanedas Gimpera, Olot (ES); Marc Soto Hernández, Barcelona (ES)

(73) Assignee: DRYLYTE, S.L., Barcelona (ES)

( * ) Notice: Subject to any disclaimer, the term of this patent is extended or adjusted under 35 U.S.C. 154(b) by 0 days.

(21) Appl. No.: 17/682,432

(22) Filed: Feb. 28, 2022

(65) Prior Publication Data

US 2022/0177730 A1     Jun. 9, 2022

Related U.S. Application Data

(60) Division of application No. 17/138,103, filed on Dec. 30, 2020, which is a continuation of application No. PCT/ES2019/070753, filed on Nov. 6, 2019.

(30) Foreign Application Priority Data

Nov. 12, 2018 (ES) .................... 201831092
Feb. 21, 2019 (ES) .................... 201930148

(51) Int. Cl.
*C09G 1/18* (2006.01)
*C09G 1/16* (2006.01)

(52) U.S. Cl.
CPC ......... *C09G 1/18* (2013.01); *C09G 1/16* (2013.01)

(58) Field of Classification Search
CPC ................ C09G 1/16; C09G 1/18; C25F 3/24
See application file for complete search history.

(56) References Cited

U.S. PATENT DOCUMENTS

| | | | |
|---|---|---|---|
| 3,523,834 | A | 8/1970 | Hewins |
| 6,074,284 | A | 6/2000 | Tani et al. |
| 6,739,953 | B1 | 5/2004 | Berman et al. |
| 6,957,511 | B1 | 10/2005 | Leigh et al. |
| 10,683,583 | B2 | 6/2020 | Sarsanedas-Millet |
| 2003/0178320 | A1 | 9/2003 | Liu |
| 2004/0019389 | A1 | 1/2004 | Swords |
| 2005/0014890 | A1 | 1/2005 | Small |
| 2006/0163083 | A1* | 7/2006 | Andricacos ....... H01L 21/32125 205/674 |
| 2007/0017818 | A1 | 1/2007 | Emesh et al. |
| 2008/0099345 | A1 | 5/2008 | Piesslinger-Schweiger |
| 2008/0188162 | A1* | 8/2008 | Kobata ............... H01L 21/7684 451/8 |
| 2008/0217186 | A1 | 9/2008 | Bohme |
| 2010/0096584 | A1 | 4/2010 | Saeki |
| 2014/0018244 | A1 | 1/2014 | Taylor |
| 2017/0144239 | A1 | 5/2017 | Luo |
| 2020/0270763 | A1 | 8/2020 | Sarsanedas-Millet |

FOREIGN PATENT DOCUMENTS

| | | | |
|---|---|---|---|
| DE | 2031833 | A1 | 12/1971 |
| ES | 2604830 | A1 | 3/2017 |
| GB | 1513532 | A | 6/1978 |
| JP | 2002093758 | A | 3/2002 |
| JP | 2008196047 | A | 8/2008 |
| JP | 2017214615 | A * | 12/2017 |
| JP | 2017214615 | A | 12/2017 |
| WO | 2006119058 | A1 | 11/2006 |
| WO | 2007121999 | A2 | 11/2007 |
| WO | 2010084213 | A1 | 7/2010 |
| WO | 2017186992 | A1 | 11/2017 |

OTHER PUBLICATIONS

International Search Report and Written Opinion received in international application No. PCT/ES2019/070753, dated Dec. 18, 2019 (17 pages).
International Search Report and Written Opinion received in international application No. PCT/ES2017/070247, dated Aug. 9, 2017, with English translation (5 pages).
Extended European Search Report in related European Application No. 17788863.3, dated Jun. 14, 2019 (7 pages).
International Search Report received in related application No. PCT/ES2019/070027, dated Apr. 4, 2019 (4 pages).
Amberlite Data Sheet (https://www.lenntech.com/Data-sheets/Rohm-&-Haas-Amberlite-252-RF-H-L.pdf) Year: 2000 (2 pages).

* cited by examiner

*Primary Examiner* — Shuangyi Abu Ali
(74) *Attorney, Agent, or Firm* — Edell, Shapiro & Finnan, LLC

(57) ABSTRACT

Use of dry electrolytes to polish metal surfaces through ion transport. A conductive liquid of the dry electrolyte includes at least a sulfonic acid. According to one embodiment, the porous particles of the dry electrolyte include sulfonate polymer, such as, polystyrene divinylbenzene. According to one embodiment, the conductive liquid of the dry electrolyte includes methane-sulfonic acid. Preferably, the concentration of the sulfonic acid in relation to the solvent is ranging from 1 to 70%. Optionally, the conductive liquid of the dry electrolyte includes a complexing agent and/or a chelating agent.

10 Claims, No Drawings

USE OF SULFONIC ACIDS IN DRY ELECTROLYTES TO POLISH METAL SURFACES THROUGH ION TRANSPORT

CROSS-REFERENCE TO RELATED APPLICATIONS

This application is a divisional of U.S. application Ser. No. 17/138,103, filed Dec. 30, 2020, which relates to and claims the benefit and priority to International Application No. PCT/ES2019/070753, filed Nov. 6, 2019, which claims the benefit and priority to each of Spanish Patent Application Nos. P201831092, filed Nov. 12, 2018 and P201930148, filed Feb. 21, 2019, the entire contents of which are hereby incorporated by reference.

FIELD

The field of this invention is the sector of the industry focused in smoothing, burnishing and polishing metal surfaces, with applications in fields such as, for example, the dental, medical, automotive and aeronautical industry, inter alias.

OBJECT OF THE INVENTION

An object of the invention is to smooth and polish metal surfaces characterized by the use of ion transport that uses free solid bodies that contain sulfonic acids as electrolytes, and also the free solid bodies that contain sulfonic acids to carry out this method. The use of the free solid bodies that contain sulfonic acids has distinguished advantages and characteristics that mean a significant novelty compared with the known state-of-the-art.

BACKGROUND

There exist systems established to polish metals characterized by the use of particles that are not joined to any support, that means free solid bodies, that produce mechanical abrasion by friction due to a relative movement between the particles and the surface to be treated. The said particles must be harder than the material to be treated.

The systems based on mechanical abrasion are lacking evenness due to the fact that the effect of the abrasion is related to the pressure between the surface and the particles. This means that the metal parts that protrude sustain more abrasion than the parts occluded. This generally results in an excessive rounding of vertices and edges of the parts to be treated. This is a significant hindrance in the use of mechanical abrasion systems in metals that require accurateness or sharp edges.

In addition, the systems based on the mechanical abrasion produce deformations, at a level depending of the size of the particles, on the metal surface. In this process, the metal surfaces are contaminated by inclusions coming from the particle. These modifications of the composition of the metal surface, often give rise to a decrease, for example, of the chemical resistance, the tensile strength or the durability.

There are also systems stablished to polish metals characterized by the use of an electric current on the metal submerged in a liquid electrolyte. These electropolishing systems provided as result metal surfaces free of external inclusions.

However, the electropolishing systems have a smoothing effect on the roughness of the order of magnitude of micrometers. The conventional commercial electropolishing systems often claim a reduction of the roughness ranging from 50 to 60% on the initial roughness. In many applications, this smoothing level is not sufficient.

In addition, the electropolishing systems, because of their intrinsic operation, tend to disclose the underlying crystalline structure of the metal, or metallic salt or metallic oxide formed. This gives rise to staggered surfaces, holes and other related defects to the metal structure. Thus, the electropolishing systems are extended in metals and alloys that, because of their chemical properties, can intrinsically overcome these limitations, for example, aluminum. However, they cannot be used in many other metals and alloys without these drawbacks.

Some of the problems of the metal polishing systems based in mechanical abrasion and electropolishing systems were solved by the use of free solid bodies to polish metal surfaces through the ion transport. The same applicant owns Spanish Patent No. 2604830 B1 that refers to a "method to smooth and polish metals through ion transport by means of free solid bodies ( . . . )". The said free solid bodies can carry out an ion transport composed by a set of porous particles that retain a given amount of liquid, and a liquid conductive electrolyte that is retained in the particles, preferably aqueous HF ranging from 1 to 10%. However, the said electrolyte does not provide satisfactory results in many metals, such as, for example, iron and the iron alloys.

The objective of this invention is to develop an improved dry electrolyte for the use in the method to smooth and polish metals through ion transport by means of free solid bodies.

SUMMARY

The use of sulfonic acids in free solid bodies or particles to polish metal surfaces through ions transport is a novelty in the field of metals polish that has the advantages and characteristics that are explained in the following text.

A dry electrolyte comprises a set of porous particles with the capacity to retain a given amount of liquid and a given amount of electrically conductive liquid.

This invention specifically refers to dry electrolytes that comprise porous particles with the capacity to retain a given amount of liquid, and a given amount of electrically conductive liquid that contains at least one sulfonic acid.

In this invention, the electrically conductive liquid comprises at least one sulfonic acid. The sulfonic acids are composed with a general formula RSO3H, where R can be any organic substituent, either alkyl o aromatic, another functional group or a halogen atom. This is the general structure of a sulfonic acid.

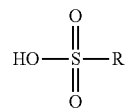

Preferably, the sulfonic acids used are those having a high solubility in water or another chosen dissolvent. In addition, preferably, those sulfonic acids that form soluble salts with the related metals. For example, can be used, but without limiting purposes, the sulfonic acids such as methanesulfonic acid CH3SO3H, trifluorosulfonic acid CF3SO3H, fluorosulfonic acid FSO3H, chlorosulfonic acid ClSO3H, para-toluenesulfonic acid 4-CH3C6H4S03H and sulfamic acid NH2SO3H, all of them thereafter represented by:

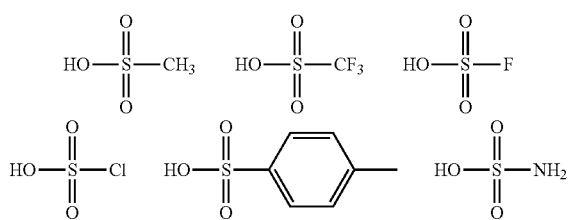

The sulfonic acids can be used pure in the event that they are liquid at the working temperature or in solution. The optimal concentration of sulfonic acid shall be empirically determined as it depends on the sulfonic acid chosen, the dissolvent and also the parameters of the part to be treated, such as the type of metal, the full surface and the shape. In solution, the preferred options of solvent are water or a polar solvent due to conductivity and solubility reasons. Preferably, the water is the chosen dissolvent. Concentrations of sulfonic acid in the conductive liquid from 1 to 70% demonstrated to be active in this process. Preferably, concentrations from 2 to 40%. These concentrations refer to the final concentration of the electrically conductive liquid in the dry electrolyte, regardless of how the dry electrolytes are prepared.

The sulfonic acids are strong acids, and their handling in liquids or in solutions, as for their use in the classic electropolishing, carried many handling risks. In liquid state or in solution, these sulfonic acids can produce an unwanted attack on the metal surfaces. Therefore, after using sulfonic acids in the classic electropolishing, often a further neutralizing step is required.

However, when it is limited to the porous particles, the handling becomes easier and the risks of unwanted attacks on the surface are prevented. In addition, due to the fact of being confined in particles, the effect would be focused on the surface roughness peaks, having thus a stronger effect where it is required. In addition, the relative movement of the particles with respect to the metal part makes that the particle-metal contact time is relatively short, which favors a localized action on the surface.

The sulfonic acids with an organic waste, such as, for example, without limiting purposes, methanesulfonic acid, trifluorosulfonic acid and para-toluenesulfonic acid, are much less polar than the inorganic acids. Therefore, the reduced localized polarity of these sulfonic acids facilitates their movement through the apolar resin. Namely, the smaller sulfonic acid that contains an organic waste, the methanesulfonic acid, will benefit of this effect while not sustaining steric hindrances.

In addition, other chemical compounds can be added to the conductive liquid, as complexing agents. These agents can capture the metal ions formed and increase the capacity to remove metal oxides and salts from the surface.

The complexing agents having more than one functional group are known as chelating agents. The effects of capturing and transferring metal ions would be even higher by the use of chelating agents, such as citric acid, EDTA or phosphonates. The said agents would have a high affinity due to the metal ions formed on the surface and would help to carry the said ions to the particles. In a preferred embodiment, the complexing chelating agent is a polyether.

Polyether is defined as a compound including more than one ether group (C—O—C) in its structure, without prejudice that it can include in turn other functional groups such as esters, acids, amino, amide, etc.

It has been checked that adding polyethers to the formulation of the liquid contained in the particles increases the speed of transferring ion metals and therefore increases the speed of the polishing process.

In an even more preferred embodiment, the polyether is a linear alkyl polyether. Within the group of the polyethers are specifically included to crown ethers and to alkylpolyethers. The alkylpolyethers can have different shapes, such as linear, star-shaped, branched or comb-shaped. For the electropolishing process we have found that the linear alkylpolyethers provide best results in the process, as they are more active at the moment of forming metal complexes.

Within the category of linear alkylpolyethers chelating complexing agents the polyethyleneglycol or PE is standing out, also called poly(oxy-1,2-ethinhediyl), poly (ethylene oxide), polyoxyethylene, polyethylene oxide and brands such as Carbowax or Macrogol.

Within the category of linear alkyl polyethers chelating complexing agents is also standing out the polypropyleneglycol or PPG.

Thereafter the PEG and the PPG are represented, wherein R can be any radical or functional group, preferably H or CH3. The number "n" of repeating the repeating unit, is a significant factor. The metal complexes with polyethers mostly adopt a tetrahedral or octahedral conformation, that means, the metal ion is surrounded by four or six atoms of oxygen, respectively, that is why the optimal number of repetitions is located around n=6, because it covers both possibilities.

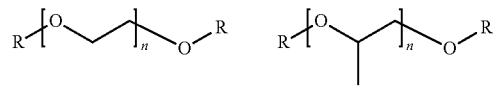

For the case of the PEG, the molecular weights of 200 to 500 Da are the preferred. Specifically PEG 300 is the most preferred.

Adding these polymers PEG and PPG to the electrically conductive liquids used in preparing dry electrolytes that contain sulfonic acids, produces electropolishing processes at high speeds and spectacular final finishes. This effect, absolutely not obvious, is due to a series of accumulated factors: they are soluble in the phase in which they find the sulfonic acids, they have the capacity to forming complexes with the metal ions removed, they act as phase transferring agents between the liquid retained in the particles and the gel phase of the particles themselves, they are stable to the voltages and intensities of current to which the process is submitted, and, in addition, they are biologically safe.

The given amount of electrically conductive liquid to impregnate the porous particles has to be sufficiently high to allow a measurable electric conductivity through the dry electrolyte. In addition, this amount has to be below the saturation point of the porous particle, in order there is no observable free liquid, being thus a "dry" electrolyte. Preferably, the amount of conductive liquid is close to but below the saturation point of the porous particle. This amount must be empirically determined because it depends on the sulfonic acid used, the type of resin, the temperature, the dissolvent and the concentration. As an example, AMBERLITE 252RFH with a water retention capacity from 52 to 58% the optimal amount of a conductive liquid that consists in 32% of methanesulfonic acid in water is ranging from 35 to 50% with respect to the resin absolutely dry weight.

The material of the porous particles used is preferably based on a sulfonate polymer, which means that it has active sulfonic acid groups RSO3H or RSO3-joined. Preferably, the porous particles sulfonate polymer is based in a styrenecopolymer and divinylbenzene. Specifically, the porous particles can be ion exchange resins, such as for example but without any limiting purpose, AMBERLITE 252RFH having an ion exchange capacity of 1.7 eq/I, a density of 1.24 g/ml, a diameter ranging from 0.6 to 0.8 mm, and a water retention capacity ranging from 52 to 58%.

The cooperative effect between the groups of sulfonic acid joined to the polymer and the sulfonic acids in the conductive liquid is interesting. It has been found, in a not obvious manner, that the fact that these groups have the same chemical structure, although in a different state, helps to the circulation of metal ions from the conductive liquid to the polymer matrix. The direct chemical environment of the metal ions in solution (complexed by sulfonates in solution) and in the polymer (complexed by sulfonates joined to the polymer) is similar. Therefore, the difference of energy levels between these states has to be very low, which presumably implies a state of transition with low energy, that is converted into a higher speed liquid-solid transfer. This has two positive effects for the process, on the one hand, it makes that the process is speedier and, on the other hand, it improves the general capacity of the resin to act as receptor of metal ions, that lengthens the useful life of the dry electrolyte.

Thus, the sum of these not obvious different effects when using sulfonic acids in dry electrolytes to polish metal surfaces through the ions transport allows that the speedier processes obtain spectacular results increasing at the same time the useful life of the dry electrolyte.

It is also an object of this invention the dry electrolyte containing sulfonic acid.

EXEMPLARY EMBODIMENTS

Hereafter are some exemplary cases presented without any limiting aim.

Example 1

A dry electrolyte was prepared mixing and homogenizing 1.5 kg of ion exchange resin AMBERLITE 252RFH with 550 ml of a solution of methanesulfonic acid to 4% of water. This dry electrolyte is used to polish a part of iron alloy with the following composition expressed in % C (0.17-0.23) Si (0.40) Mn (0.65-0.95) V (0.025) S (0.050) Cr (0.35-0.70) Ni (0.40-0.70) Mo (0.15-0.55) Cu (0.35) Al (0.050) with a surface area of 5 cm2. The counter-electrode was a network of iridium on titanium. The current used was a positive wave of an electric current of 50 Hz at 20 V, that provided an intensity of 0.1 A. The part had a downwards/upwards movement at around 4 Hz and the dry electrolyte container was submitted to a vibration. After 5 minutes of this proceeding, the metal surface had acquired spectacular properties.

Example 2

A dry electrolyte was prepared mixing and homogenizing 5.3 kg of ion exchange resin AMBERLITE 252RFH with 1950 ml of a methanesulfonic acid solution at 32% in water. This dry electrolyte is used to polish a part of iron alloy having the same composition as before with a surface area of 36 cm2. The counter-electrode was a network of iridium on titanium. The current used was a positive wave of an electric current of 50 Hz at 30 V. The part had an upwards/downwards movement at around 4 Hz and the dry electrolyte container was submitted to a vibration. After 10 minutes of this process, the metal surface had acquired spectacular properties.

Example 3

A solution was prepared with 550 mL of methane sulfonic acid 70%, 160 mL PEG and 3000 mL of de-ionized water. This solution is mixed and homogenized with 6.7 kg of ion exchange resin AMBERLITE 252RFH to produce a dry electrolyte. This dry electrolyte was used to polish a part of carbon steel of 36 cm2. The counter-electrode used was a network of iridium on titanium. The current used was a positive wave of an electric current of 50 Hz at 30 V. The part had a downwards/upwards movement ca. 4 Hz and the dry electrolyte container was submitted to vibration. After 5 minutes of this process the metal surface had acquired spectacular properties.

With these instructions, it is expected that a man skilled in the art could reproduce these results without any further problem.

The disclosed in the following clauses are additional embodiments.

Clause 1. Use of dry electrolytes to polish metal surfaces through ion transport, characterized in that the conductive liquid of the dry electrolyte comprises at least a sulfonic acid.

Clause 2. Use of dry electrolytes to polish metal surfaces through ion transport, as stated in clause 1, characterized in that the porous particles of the dry electrolyte comprises sulfonate polymer.

Clause 3. Use of dry electrolytes to polish metal surfaces through ion transport, as stated in clause 2, characterized in that the porous particles of the dry electrolyte comprises ions exchange resins of polystyrene-divinylbenzene.

Clause 4. Use of dry electrolytes to polish metal surfaces through ion transport, according to any of the preceding clauses, characterized in that the conductive liquid of the dry electrolyte comprises methane-sulfonic acid.

Clause 5. Use of dry electrolytes to polish metal surfaces through ion transport, according to clauses 1 and 4, characterized in that the concentration of sulfonic acid in relation to the solvent is ranging from 1 to 70%.

Clause 6. Use of dry electrolytes to polish metal surfaces through ion transport, according to any of the preceding clauses, characterized in that the conductive liquid of the dry electrolyte comprises a complexing agent.

Clause 7. Use of dry electrolytes to polish metal surfaces through ion transport, according to clause 6 characterized in that the complexing agent comprises a polyether.

Clause 8. Use of dry electrolytes to polish metal surfaces through ion transport, according to clause 7 characterized in that the polyether is linear alkyl.

Clause 9. Use of dry electrolytes to polish metal surfaces through ion transport, according to clause 8 characterized in that the polyether is polyethyleneglycol.

Clause 10. Use of dry electrolytes to polish metal surfaces through ion transport, according to the clause 9 characterized in that the polyethyleneglycol has a molecular weight ranging from 200 to 500 Da.

Clause 11. Use of dry electrolytes to polish metal surfaces through ion transport, according to the clause 8 characterized in that the polyether is polypropyleneglycol.

Clause 12. Use of dry electrolytes to polish metal surfaces through ion transport, according to any of the preceding clauses, characterized in that the conductive liquid of the dry electrolyte comprises a chelating agent.

Clause 13. Dry electrolyte characterized in that it comprises sulfonic acid as conductive liquid according to any of the preceding clauses.

What is claimed is:

1. A plurality of free solid bodies that each comprises a porous particle containing an electrically conductive liquid in an amount below a saturation point of the porous particle, the porous particle comprising a sulfonate polymer that includes first sulfonic acid groups, the electrically conductive liquid comprising second sulfonic acid groups soluble in the electrically conductive liquid, the first and second sulfonic acid groups being in different states and having a same chemical structure, the second sulfonic acid groups comprising trifluorosulfonic acid.

2. The plurality of free solid bodies according to claim 1, wherein the porous particle comprises an ion exchange resin of polystyrene-divinylbenzene.

3. The plurality of free solid bodies according to claim 1, wherein the electrically conductive liquid comprises a complexing agent.

4. The plurality of free solid bodies according to claim 3, wherein the complexing agent comprises a polyether.

5. The plurality of free solid bodies according to claim 4, wherein the polyether is a linear alkyl.

6. A plurality of free solid bodies that each comprises a porous particle containing an electrically conductive liquid in an amount below a saturation point of the porous particle, the porous particle comprising a sulfonate polymer that includes first sulfonic acid groups, the electrically conductive liquid comprising second sulfonic acid groups soluble in the electrically conductive liquid, the first and second sulfonic acid groups being in different states and having a same chemical structure, the second sulfonic acid groups comprising chlorosulfonic acid.

7. The plurality of free solid bodies according to claim 6, wherein the porous particle comprises an ion exchange resin of polystyrene-divinylbenzene.

8. The plurality of free solid bodies according to claim 6, wherein the electrically conductive liquid comprises a complexing agent.

9. The plurality of free solid bodies according to claim 8, wherein the complexing agent comprises a polyether.

10. The plurality of free solid bodies according to claim 9, wherein the polyether is a linear alkyl.

* * * * *